March 22, 1938.   S. B. WILLIAMS   2,111,652
COMMUNICATING SYSTEM
Filed Feb. 19, 1936   8 Sheets-Sheet 1
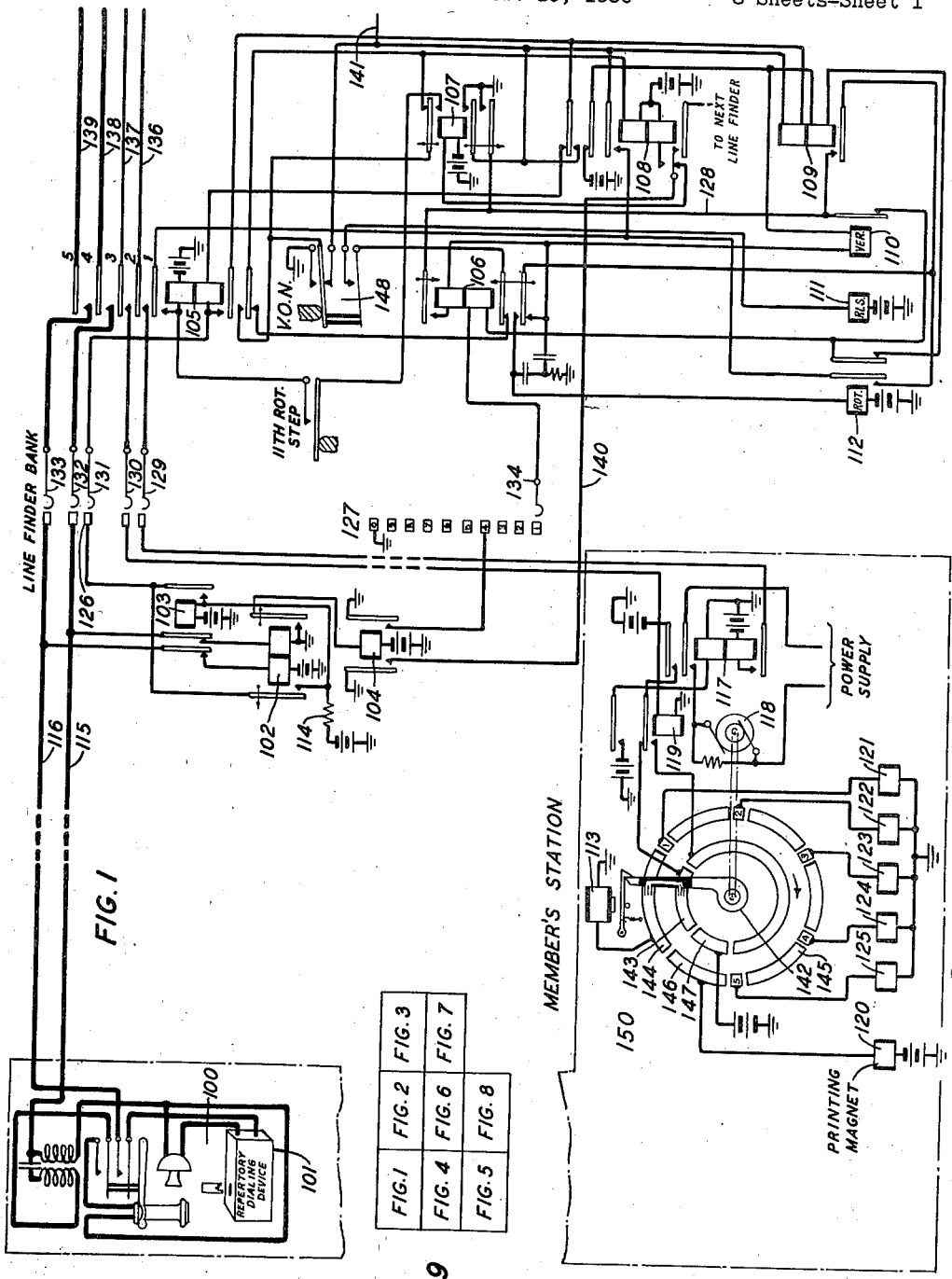

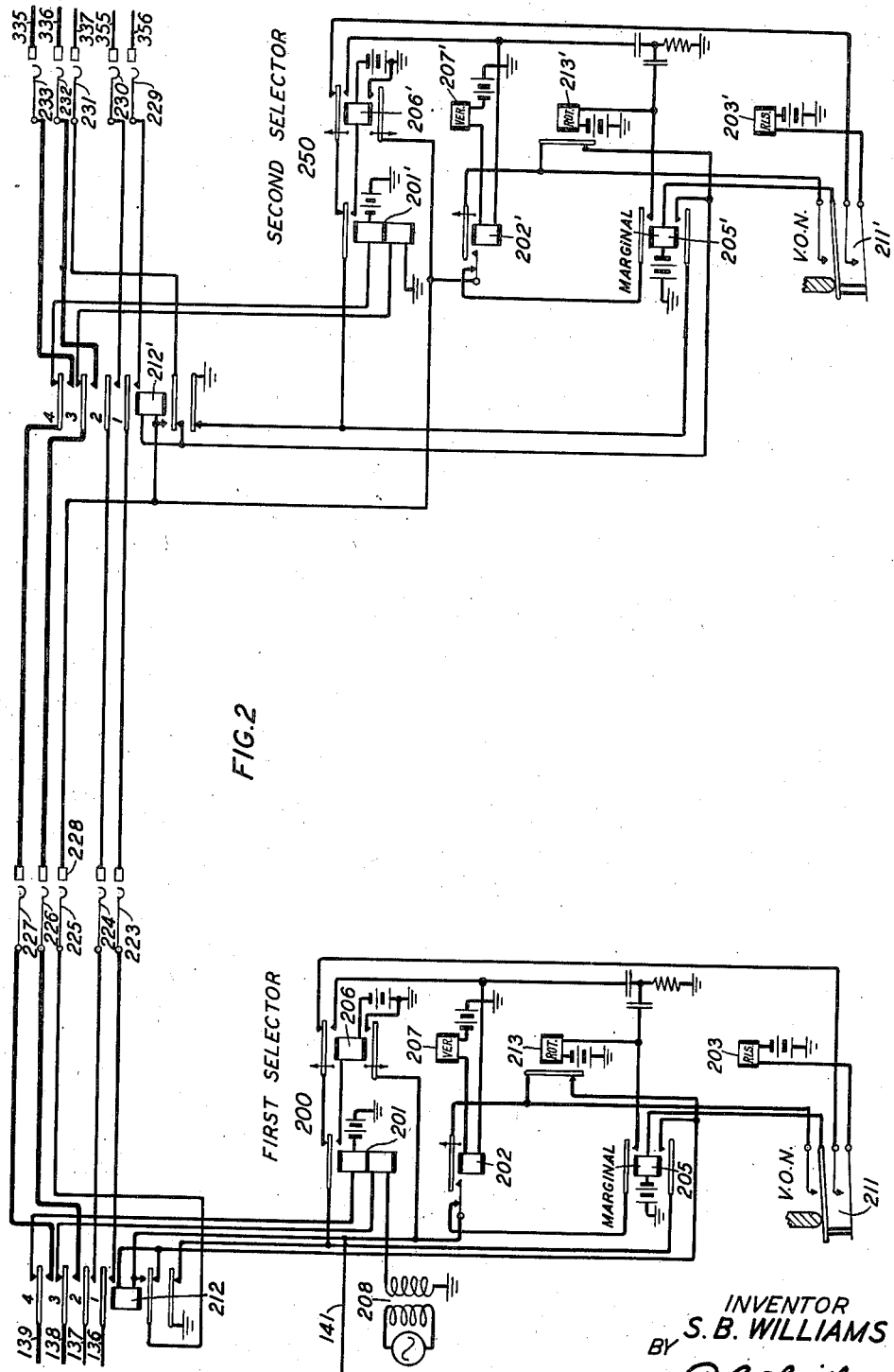

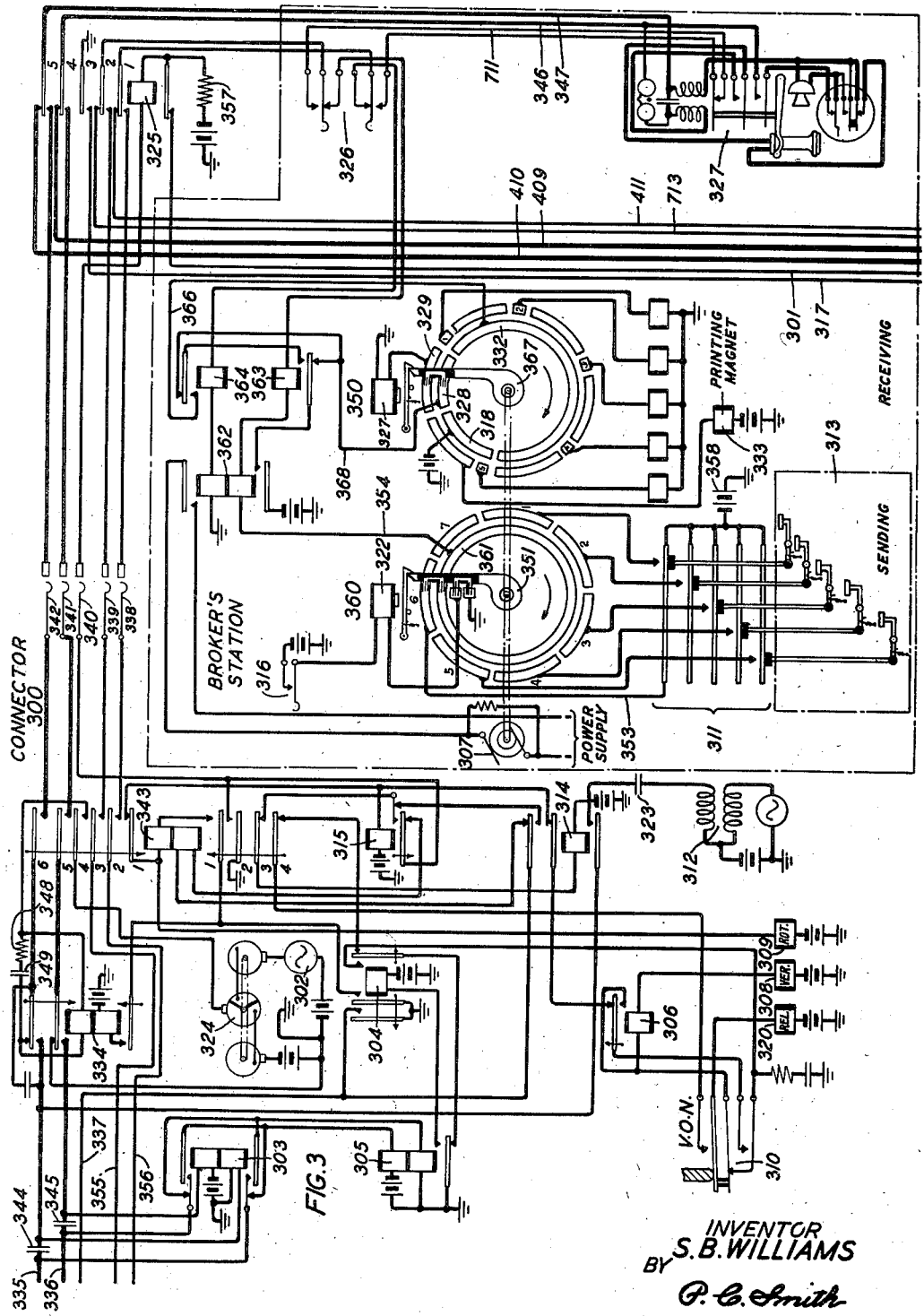

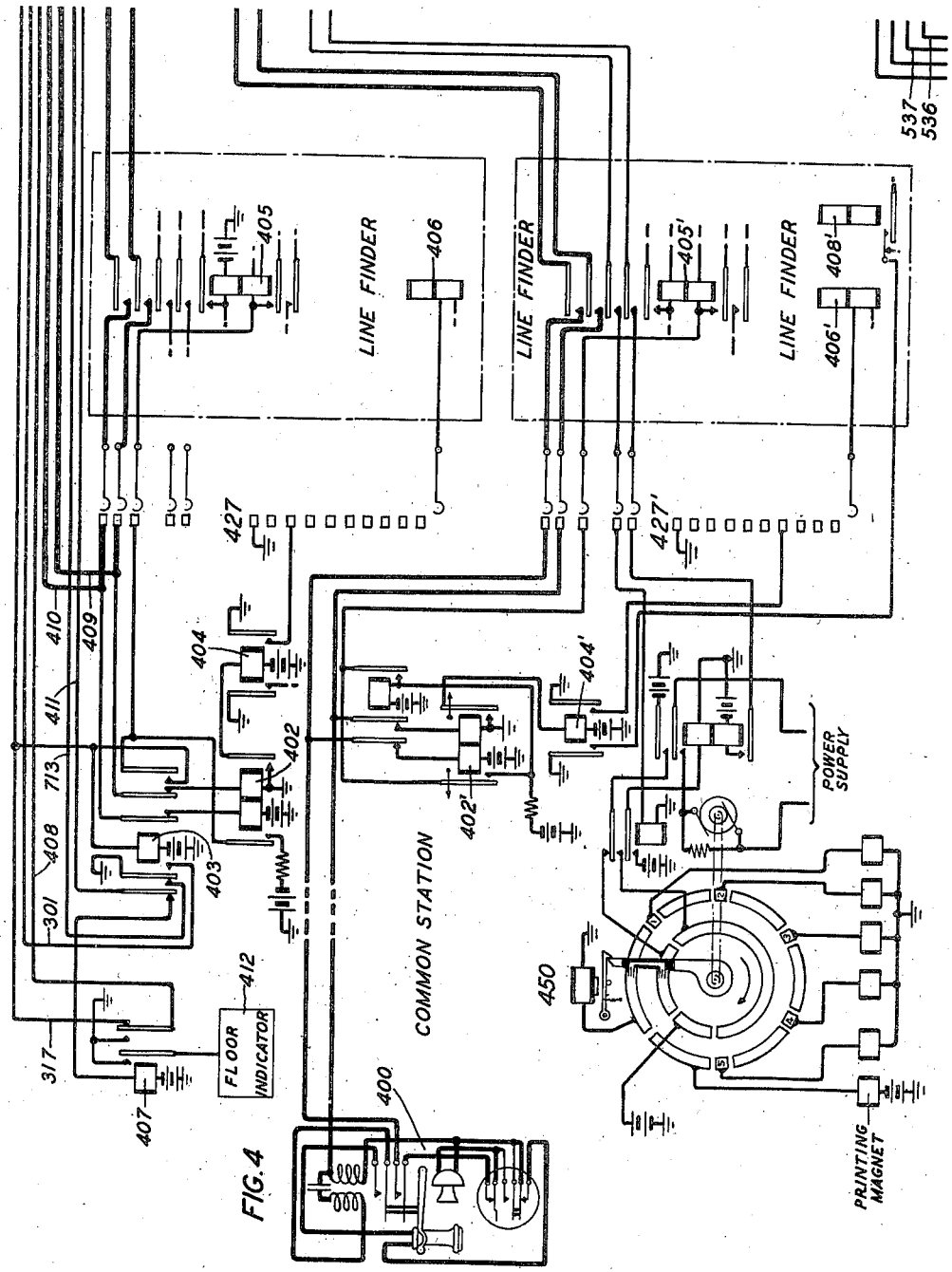

March 22, 1938. S. B. WILLIAMS 2,111,652
COMMUNICATING SYSTEM
Filed Feb. 19, 1936 8 Sheets-Sheet 5
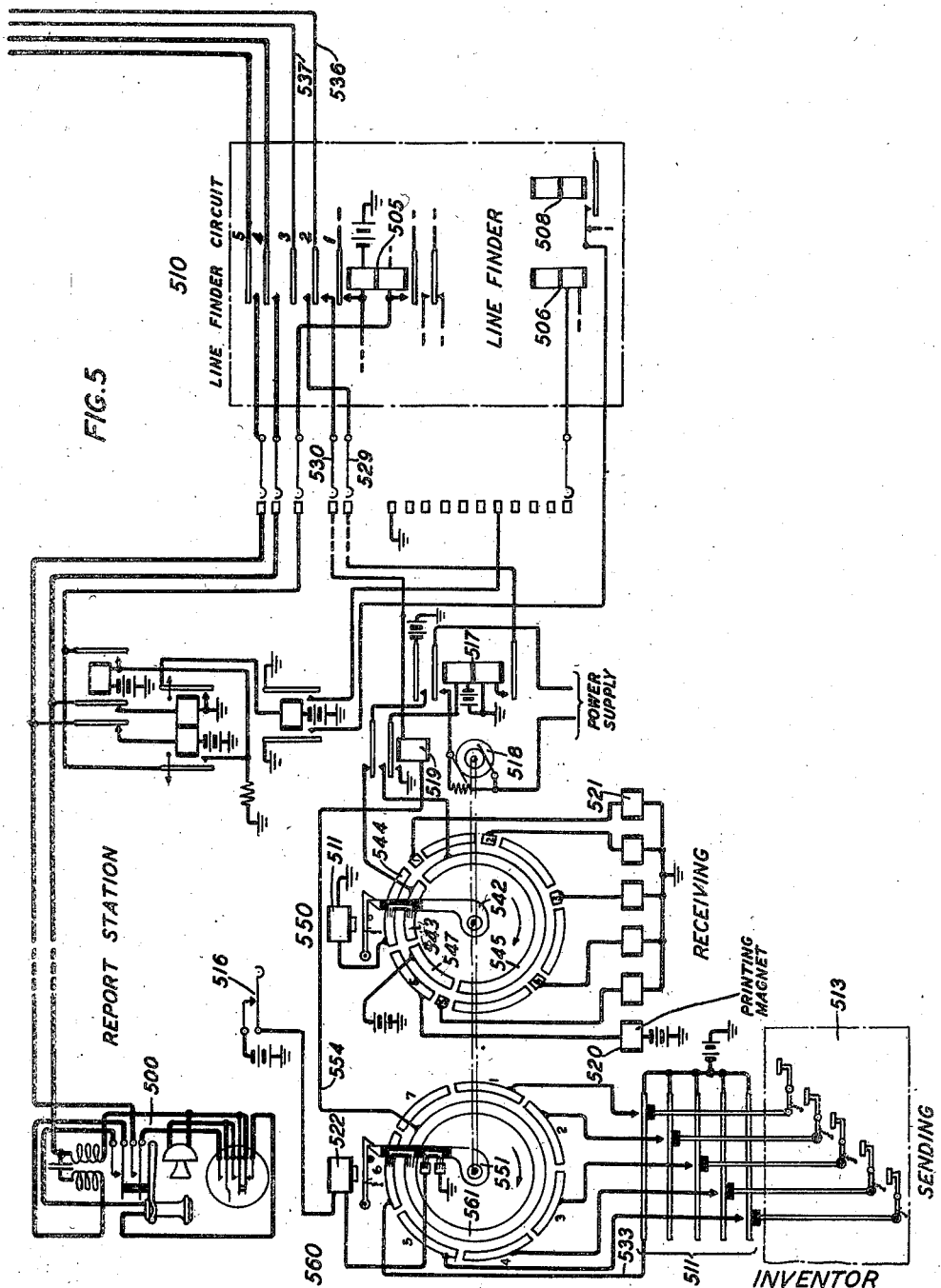

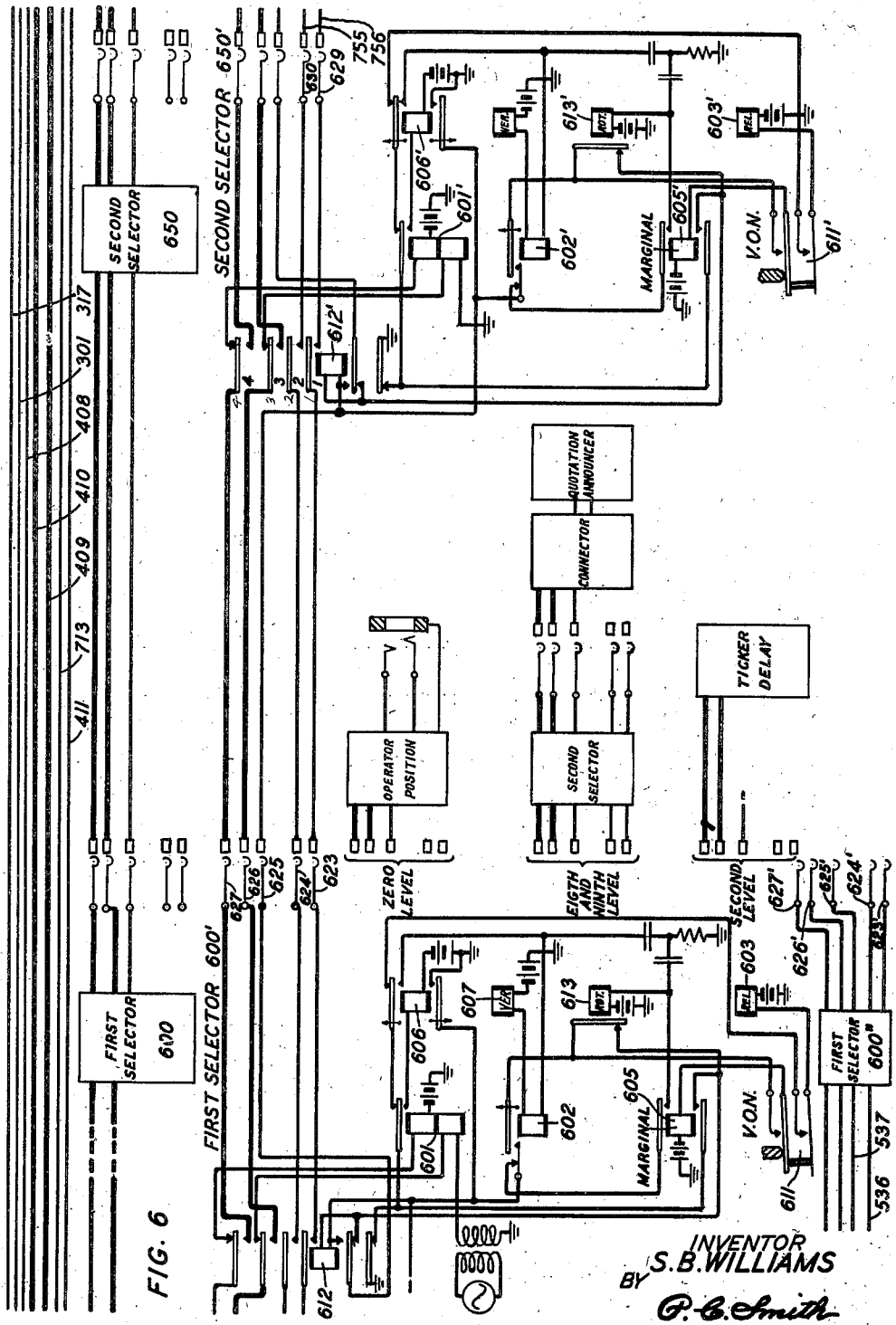

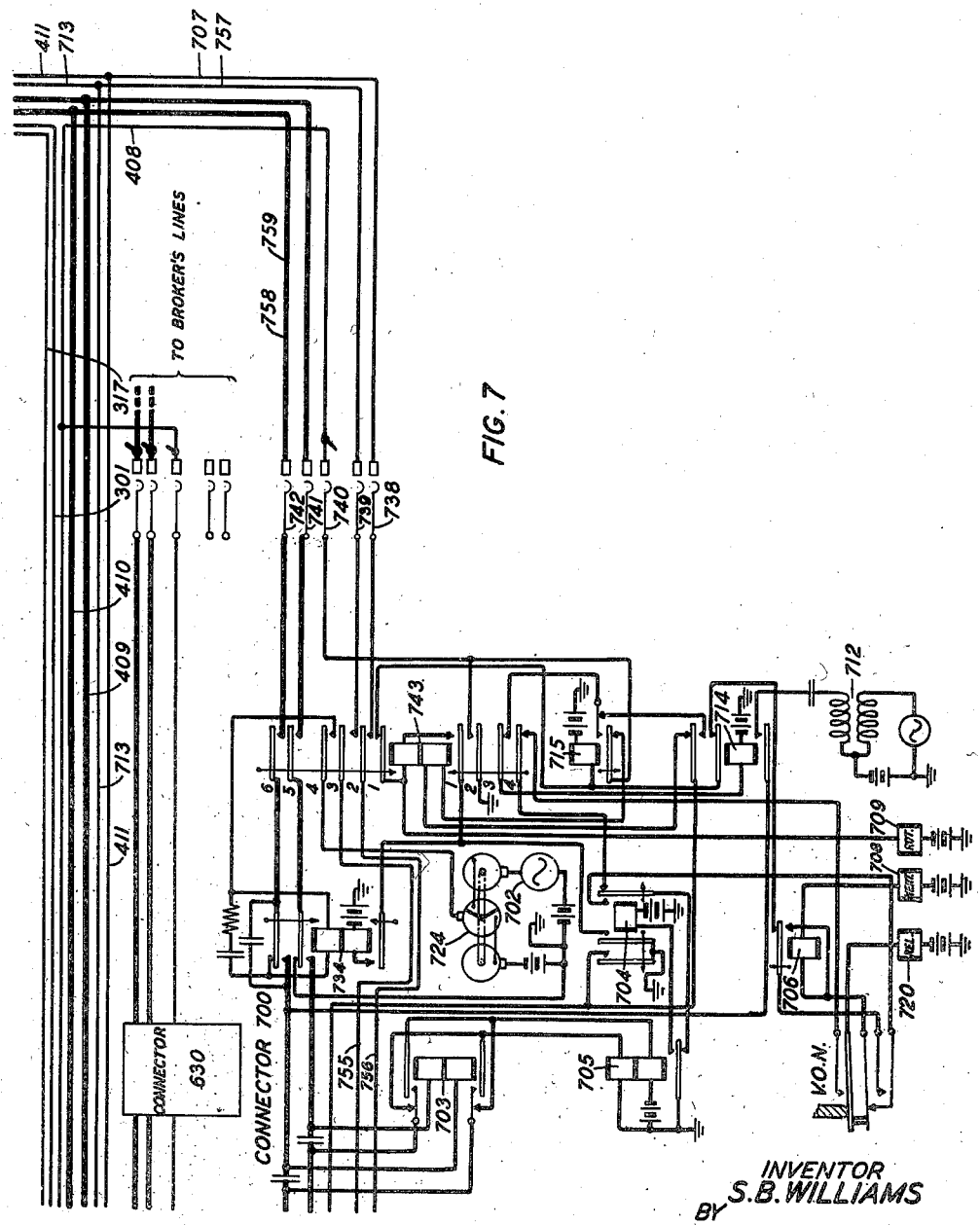

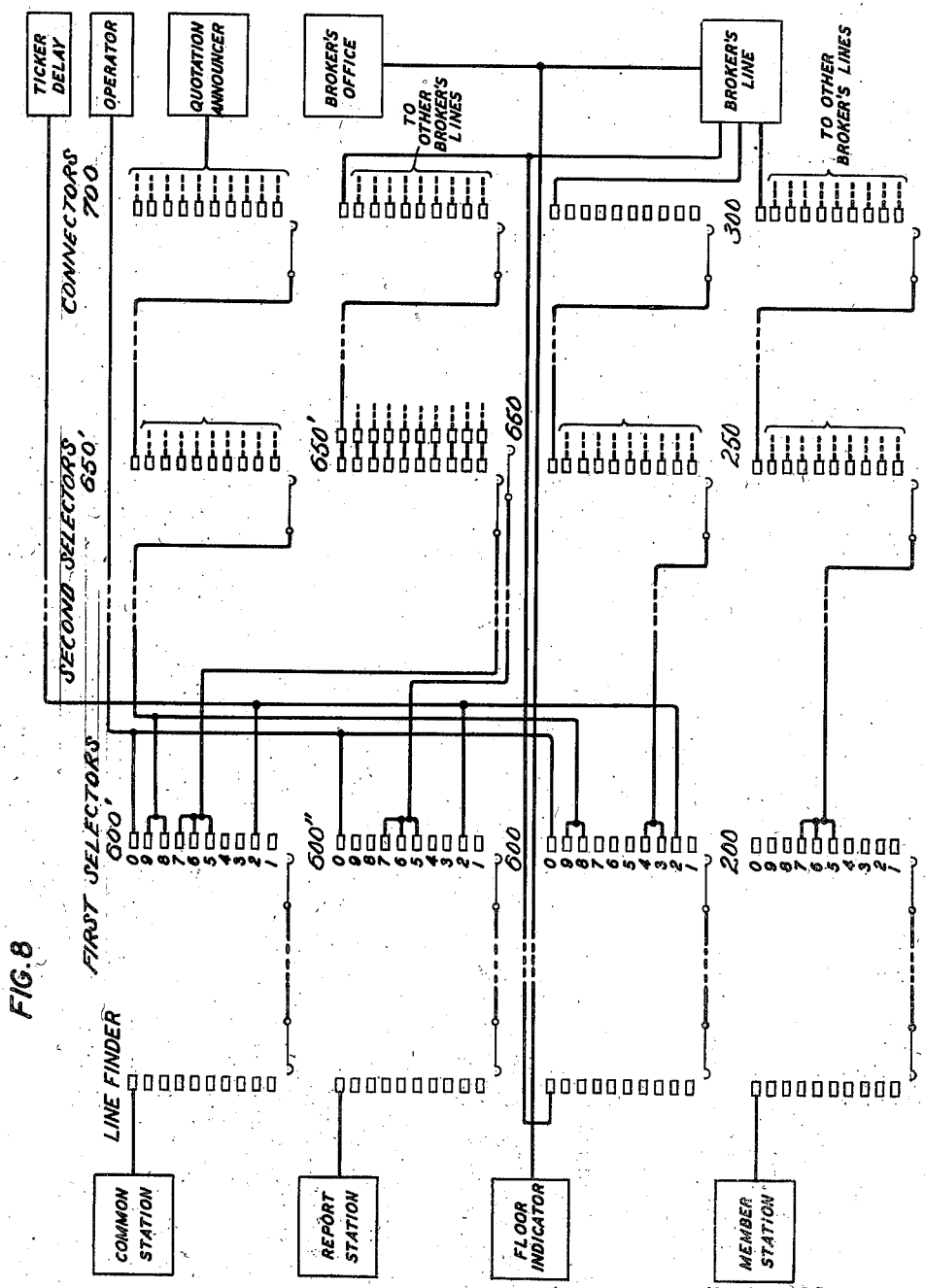

Patented Mar. 22, 1938

2,111,652

UNITED STATES PATENT OFFICE 2,111,652

COMMUNICATING SYSTEM

Samuel B. Williams, Brooklyn, N. Y., assignor to Bell Telephone Laboratories, Incorporated, New York, N. Y., a corporation of New York Application February 19, 1936, Serial No. 64,691

12 Claims. (Cl. 179—4)

This invention relates to communication systems and more particularly to one intended for the simultaneous establishment of telephone and recording connections with switches controlled by key-controlled dial senders. One application of this invention has been adapted for use in the purchase and sale of securities and, accordingly, would replace the manual facilities now provided for the execution of such transactions in places like the New York Stock Exchange, for instance. It is understood, however, that the invention is not limited to the specific structure hereinafter described by way of example but, due to its flexibility, can be easily adapted by any one skilled in the switching art to a variety of uses where transactions at a distance must be secretly and expeditiously conducted by conversation between the parties involved and the substance of the transactions recorded when the transaction takes place.

Briefly, my invention comprises a communication system in which each station of a first group of stations is equipped with a telephone instrument, a dial, a telegraph transmitter and a telegraph receiver. Each of these stations is provided with a private line and another line to either of which the station is available for calling purposes. A second group of stations is provided at the location where the business of buying and selling takes place and each of the stations of this second group is equipped with a handset telephone and a telegraph receiver. Each of these telephones is not equipped with the usual ringer but is provided, instead, with a key-operated dialing device or other equivalent means, so that the telephone cannot be used unless first operated by a key.

In the proximity of this second group of stations an annunciator or "floor indicator" is provided which has a separate visual signal for each one of the persons authorized to use the second group of stations. Each of these signals can be set, or operated, over another private line from each of the first stations by the operation of the key provided thereat, and each signal identifies the agent or authorized representative of the station that controls the operation of the signal. When a signal is operated, the person identified by it understands that he must communicate with the station that called him, which he can do by going to any station in the second group and inserting the key in the dial apparatus of the station. An impulse train is generated by the dial apparatus which is effective in setting a number of selective switches between the calling station in the second group and the private line of the calling station in the first group and when the connection is answered, the signal is retired. This connection comprises a telephone circuit over which the parties may converse, and a telegraphic connection between the printer receiving equipment at the station of the second group and the transmitting equipment at the station of the first group. The communicating parties may now orally discuss business over the telephone connection and confirm it over the telegraph connection.

Besides the foregoing arrangement between the station of the first group and the stations of the second group, there are two other groups of stations, a third and a fourth. The third group comprises individual stations having a regular telephone and dial associated with a receiving printer. Through this station, a person may, through usual dial responsive switches, reach any station in the first group, a distant operator, a mechanical announcing system, or whatever outlet or source of information is placed within reach of the common equipment. The object of the receiving printer at the station of the third group is, in this case, to make it possible when connection is made with a station of the first group to confirm an order or the substance of the conversation between the parties. The fourth group of stations comprises individual stations having similar equipment to the stations of the second group but, in addition, each is provided with a telegraph transmitter for sending reports to the stations of the second group.

As applied to a stock exchange and to the buying and selling of securities therein, the invention as briefly outlined above makes it possible to eliminate many of the present day wasteful practices incidental to manual practices and provides for the speedy and secret transfer of orders directly from the broker's office to the floor member who is to execute the order. At present, the trading floor proper in the New York Stock Exchange, for example, is surrounded with brokers' booths around the walls. No one except exchange members and stock exchange employees is permitted on the trading floor during trading, members' clerks being required to walk around the edge of the trading floor to go to their respective booths. In the system of my invention, the members' booths are replaced by stations of the second, third and fourth group as above described and in which the stations of the second group are reserved for the exclusive use of the members themselves, each of them being provided with a special dial key with which to set up a secret connection over a private channel from any of these stations to the broker's office identified by the key. Each of the brokers' offices, of course, comprises a station in the first group of stations.

The transaction of business between a broker's office and the stock exchange member can, with this arrangement of my invention, be conducted directly between broker and member and with relative simplicity. When, for instance, a broker has an order he wishes to execute, he operates the key which causes the setting of the floor indicator at the exchange. The member of the exchange who represents the broker, seeing his identifying number displayed on the indicator, knows that he is wanted by the brokerage office and proceeds immediately, or as soon as possible, to a station in the second group, which may aptly be termed "member's station", and, by inserting his key into the telephone set, causes selective equipment to establish a connection to the broker's office, after which the order is transmitted over telephone from the office and keyed on the transmitter, said order being, of course, recorded on the receiving equipment at the member's station.

The other two groups of stations at the stock exchange, that is, the third and fourth and which may be termed "common stations" and "report stations" may be used by all exchange members alike for purposes of general communication and confirmation of orders.

A clearer conception of the scope and purpose of the invention may be obtained from the following description and attached drawings, in which Fig. 1 shows a member's station and line-finder;

Fig. 2 shows the first and second selectors;

Fig. 3 shows the connector, the broker's line and the broker's station;

Fig. 4 shows the common station, the calling side of the broker's station and the line-finder equipment available to each;

Fig. 5 shows the report station;

Fig. 6 shows, schematically, the relation between the first selector stages available, respectively, to the common station and the broker's line and the second selector stages, with means for completing the several connections to different destinations;

Fig. 7 shows a connector in the train for completing a connection to a broker's line;

Fig. 8 shows the trunking layout of my invention; while

Fig. 9 shows the manner in which the several figures are to be arranged in order to completely disclose the invention.

Before considering the detailed operations involved in establishing connections between the various types of stations on the floor of the stock exchange and the different other stations in and out of the exchange, attention is directed to Fig. 8 which shows the trunking layout of the invention as a whole. From an inspection of this figure it will be observed that there are three different types of stations on the floor of the exchange, namely, a member station, a report station and a common station.

Of the first, a number of them are conveniently located around the trading center of the exchange, are equipped with a telephone set having a key controlled dial and a teletype printer or similar equipment, and are accessible to members only, each of whom is provided with a dial key that can operate the dial to establish a connection only with his own broker's office. For this purpose, the switching train accessible to the members' stations at the line-finder terminal banks consists of a suitable number of first and second selectors and connectors. On the terminal banks of the connectors appear the brokers' lines which may be called from the several members' stations.

The report station, of which a number are also conveniently distributed around the trading floor, comprises the usual dial telephone instrument and a regular teletype transmitter and receiver or similar equipment, and is accessible to all for establishing connections, by the dialing of appropriate code numbers: (1) to the exchange "Operator"; (2) to any of the brokers' lines; and (3) to the Ticker Delay announcer. The trunks extending to the operator's position are, of course, wired to the last or zero level of the first selector banks and extend directly therefrom to the operator's position, making it thus possible to reach the operator from the report station by simply dialing the digit 0. The fifth, sixth and seventh bank levels of the first selector extend to second selectors which have access to a group of connectors having their terminal banks extending to the various brokers' lines so that any broker's line may be reached from any report station by dialing the number of the line desired, which number has 5, 6 or 7 as its first digit. The terminals of the second bank level extend directly to the Ticker Delay equipment so that by dialing the digit 2, it is possible to learn how far the ticker is behind "floor operations".

The common station consists of the usual dial telephone instrument and is available to all in the exchange. The second bank level of terminals on the first selectors available to the common station is reserved for trunks extending directly to the "Ticker Delay" equipment. The fifth, sixth and seventh bank levels extend to second selectors which can reach the brokers' lines, the eighth and ninth bank levels extend to second selectors which can reach the "quotation announcer" mechanism so that by dialing the code of a particular security from the common station, a report is received on the latest quoted price of said security, while the zero bank level of the selector is reserved for trunks extending to the operator's position.

In the arrangement of my invention, each of the brokers' offices can reach every other broker's office as well as the Ticker Delay mechanism, the quotation announcer mechanism and the operator's position. In order to provide this service, another switching train is provided from the broker's line-finder banks which can be extended to any of the desired outlets by dialing the code number assigned to each of said outlets, which code numbers may be the same as those to be used from any of the floor stations.

The exchange is further provided with a visual floor indicator which is controlled from each of the brokers' offices to light up a number which identifies the member who represents the broker on the floor of the exchange so that when a particular number is flashed on the indicator, the member thus identified knows that he is to call the broker's office which he can do from any of the exchange stations.

Having thus outlined the general arrangement of the various elements of my invention, I will now describe the details of its operation by first tracing the establishment of a call from a member's station 100 shown in Fig. 1 to the broker's station 327, shown in Fig. 3.

When a member, or his representative in the exchange, desires to secretly communicate with his broker's office, he goes to any member's telephone station, such as station 100, and removes the receiver from the hook. A circuit is then completed for line relay 102 extending from grounded battery through the left winding of said relay, left outer contacts of cut-off relay 103, conductor 116, station line loop, conductor 115, left inner contacts of relay 103, right winding of relay 102 to ground. Line relay 102 operates and through its left front contact connects grounded battery through resistance 114 to the line test terminal 126, and closes an obvious circuit for group relay 104 from ground through its right contacts. Relay 104 operates, connects ground through its right contacts to the No. 4 segment of commutator 127 to mark the vertical bank of terminals in which the calling line is located and, through its left contacts, completes a circuit for relay 107 extending from ground through its left contacts, conductor 140, bottom normal contacts of relay 108, winding of relay 107 to grounded battery. Relay 107 operates and through its bottom outer contacts, connects ground to conductor 128 whereupon a circuit is completed for relay 109 extending from ground on said conductor, interrupter contacts of vertical magnet 110, right outer contacts of rotary magnet 112, lower winding of relay 109 to grounded battery over the top middle contacts of relay 108. Relay 109 operates and completes a circuit for operating vertical magnet 110. This circuit is traced from grounded battery through the top middle contacts of relay 108, winding of magnet 110, bottom outer contacts of relay 106, contacts of relay 109, conductor 128 to ground on the lower outer contacts of relay 107. Vertical magnet 110 operates, lifts the brush shaft carrying brushes 129 to 134, inclusive, to the first level of terminals and operates the vertical off-normal springs 148. The operation of vertical magnet 110 causes its interrupter contacts to open, whereupon the circuit of said magnet is opened and also that of relay 109 causing both of them to release. The previously described circuit of relay 109 is now reclosed and, with the closing of its contacts, the circuit of magnet 110 is reestablished to step the brushes to the next level of terminals, the operations continuing until the brushes have reached the fourth level of terminals and brush 134 is in contact with the fourth segment of commutator 127, at which time a locking circuit is provided for relay 109 extending from ground through the right contacts of relay 104, segment 4 of commutator 127, brush 134, lower winding of relay 106, right contacts of rotary magnet 112, lower winding of relay 109, to grounded battery on the top middle contacts of relay 108. This circuit holds relay 109 in an operated position. The operation of relay 106 opens the stepping circuit of vertical magnet 110 and completes a circuit for rotary magnet 112 extending from grounded battery through the winding of said magnet, bottom outer front contacts of relay 106, contacts of relay 109, conductor 128 to ground on the bottom outer contacts of relay 107. Rotary magnet 112 operates and rotates the brush shaft one step in a clockwise rotary direction so as to bring brushes 129 to 133, inclusive, in contact with the first set of terminals in the fourth level. As the brush shaft rotates in the horizontal plane, brush 134 is disengaged from segment 4 of commutator 127 thereby opening the holding circuit of relay 109, and the operating circuit of relay 106. Neither relay, however, releases since relay 109 now holds over the outer contacts of rotary magnet 112 and the interrupter contacts of vertical magnet 110 to ground on conductor 128 while relay 106 holds in a locking circuit which extends from grounded battery through the top middle contacts of relay 108, winding of vertical magnet 110, upper winding and top contacts of relay 106, to ground on conductor 128. The quantity of current flowing through this circuit, while sufficient to hold relay 106 in an operated position, is not sufficient to operate vertical magnet 110.

When rotary magnet 112 has operated to rotate the brush shaft to the first set of terminals, the interrupter contact of said magnet is opened whereupon the locking circuit of relay 109 is opened and relay 109 releases, causing thereby the opening of the circuit of the rotary magnet 112 and its consequent release and the reclosure of its interrupter contacts. A circuit for relay 109 is now completed extending from grounded battery as traced through the lower winding of relay 109, interrupter contacts of rotary magnet 112, interrupter contacts of vertical magnet 110 to ground on conductor 128. Relay 109 reoperates and once again completes the previously traced circuit for the rotary magnet 112, causing this magnet to operate and rotatively step the brush shaft to the next set of terminals, causing the brushes to contact therewith, whereupon, with the opening of the interrupter contacts of the rotary magnet, relay 109 will again release and cause the release of the rotary magnet. These operations continue and cause successive steps to be taken by the brush shaft until the brushes come into contact with that group of terminals connected to the calling member's station 100, the test terminal 126 of which is extended by brush 131 to the lower winding of relay 105, causing a circuit to be completed which extends from grounded battery through resistance 114, left contacts of relay 102, terminal 126, brush 131, lower winding of relay 105, top outer back contacts of relay 108, upper winding of relay 109, bottom inner contacts of relay 107, to ground. At the same time a parallel circuit is closed to the same ground for cut-off relay 103 extending from grounded battery through the winding of said relay to resistance 114 thereby operating this relay. In the first branch of the circuit, relay 105 operates sufficiently to close its locking contacts to its upper winding which is, therefore, energized in a circuit from grounded battery through this winding and locking contacts, front contact of rotary magnet 112, contacts of relay 109, conductor 128 to ground. Relay 105 now fully operates on both circuits, extends brushes 129, 130, 132 and 133 to the trunk conductors 136, 137, 138 and 139, respectively, and completes a circuit for relay 108 which extends from grounded battery through its upper winding, bottom front outer contacts of relay 105, and top front contacts of vertical off-normal springs 148 to ground. Relay 108 operates, extends conductor 140 over its bottom contacts to the next idle line-finder switch should relay 104 remain operated after the finding of station 100 by the line-finder switch shown in Fig. 1 as the result of some other member's station initiating a call and accessible through the same line-finder switch group, opens the circuit of relay 107 which releases after an interval, completes a parallel path for the locking circuit of relay 105 through the upper winding and upper locking contacts of said relay, upper inner contacts of relay 108, conductor 141 to ground on the bottom contacts of relay 206 as explained hereinafter, extends the locking circuit of cut-off relay 103 over the bottom inner contacts of relay 105, top outer front contacts of relay 108, conductor 141 to the same ground on the contacts of relay 206, and further opens the circuit of relay 109 which, upon releasing, opens the circuit of relay 106 which also releases.

Relay 107 is made sufficiently slow release so as not to open any of the circuits depending upon the ground connected through its lower contacts until relay 206 is operated as explained hereinafter to connect holding ground to conductor 141.

With the operation of relay 105 and the extension of brushes 129, 130, 132 and 133 to conductors 136, 137, 138 and 139, respectively, the line is extended to the first selector 200 which is a switch structure of the step-by-step type and capable of advancing its brushes 223 to 227, inclusive, vertically and rotationally over a bank of terminals in response to line interruptions or pulses.

Hence as soon as relay 105 operates, a circuit is completed for the line relay 201 of the first selector which extends from grounded battery through its upper winding, No. 4 back contacts of relay 212, conductor 139, No. 5 contacts of relay 105, brush 133 and cooperating bank terminal, line conductor 116, station loop, line conductor 115, brush 132 and cooperating terminal, No. 4 contacts of relay 105, conductor 138, No. 3 back contacts of relay 212, lower winding of relay 201, right winding of tone coil 208 to ground. Relay 201 operates and closes the circuit for relay 206, which circuit extends from ground through the bottom outer contacts of relay 212, front contacts of relay 201, winding of relay 206, to grounded battery. Relay 206 operates, connects ground through its bottom contacts to conductor 141 to hold the line-finder after relay 107 releases as previously described.

The member is now ready to dial the broker's line number, having received knowledge of the readiness of the apparatus to receive impulses by the reception of dial tone, which is induced in the line circuit through the right winding of coil 208, the left winding of which is connected to a source of tone.

The member dials the broker's line number by inserting the dialing key into the repertory dialing device, which may be of the type disclosed in Patent 1,917,051, issued to L. H. Morin on July 4, 1933, or any other equivalent device operating to produce a definite series of impulses in response to the use of a key individual to said series.

At the first break of the line in response to the operation of the repertory dial 101, relay 201 releases but relay 206, being slow release, remains operated, so that, for an instant, a circuit path is completed extending from ground through the bottom outer contacts of relay 212, back contacts of relay 201, top front contacts of relay 206, winding of relay 202, winding of vertical magnet 207, to grounded battery. Vertical magnet 207 operates, moving the selector shaft and brushes 223 to 227, inclusive, one step to the first level of bank terminals. The vertical off-normal springs 211 are also closed as soon as the brush shaft leaves its normal position and a circuit is then completed for relay 205 extending from grounded battery through the winding of relay 205, top contacts of the vertical off-normal springs 211, front contacts of relay 202, to ground on the bottom contacts of relay 206. Relay 205 operates and locks itself over a path through its winding, top contacts of the vertical off-normal springs 211, interrupter contacts of the rotary magnet 213, bottom contacts of relay 205, to ground on the bottom contacts of relay 212 and connects short-circuiting ground from the lower bottom contact of relay 212 over its lower contacts to the upper terminal of the winding of relay 212. At the termination of the impulse, relay 201 reoperates and breaks the circuit of relay 202 and vertical magnet 207, allowing the magnet to release preparatory to moving the brush shaft another step. Relay 202, however, is slow-to-release and will not release during the interval between impulses. At the next impulse relay 201 will again release, magnet 207 will again operate and advance the brushes 223—227 to another level of terminals. This action is continued during the transmission of the entire series of impulses characterizing the first digit of the broker's line number, relay 201 intermittently operating and releasing, in turn, causing the brush shaft controlled by the armature of the vertical magnet 207 to move said shaft upwards a corresponding number of steps.

At the end of said first series of impulses, relay 202 releases and a circuit is completed from grounded battery through the winding of rotary magnet 213, top contacts of relay 205, normal contacts of relay 202, to ground on the bottom contacts of relay 206. Rotary magnet 213 operates and rotates the brush shaft to the first set of terminals in the level of terminals to which the brushes have been raised. The operation of rotary magnet 213 also causes its contacts to be broken, thereby opening the locking circuit of relay 205, which releases. Relay 205, in releasing, removes the short-circuiting ground from the upper terminal of the winding of relay 212. If, now, the second selector to which the brushes of the first selector 200 have just been extended on the first rotary step is free, there will be no ground on guard terminal 228 with which brush 225 is engaged, whereupon a circuit is completed from grounded battery through the winding of relay 205, top contacts of vertical off-normal springs 211, interrupter contacts of rotary magnet 213, winding of relay 212, to ground on the bottom contacts of relay 206. Relay 212 operates in this circuit but, due to the high resistance of its winding, relay 205 does not operate in series with it. Relay 212 upon operating, extends the line wires to the brushes 223, 224, 226 and 227. It also breaks the circuit of impulsing relay 201, which, on releasing, releases relay 206. Relay 206, by virtue of its slow release feature, keeps conductor 141 grounded and relay 212 operated until the second selector circuit is operated to connect ground to brush 225 as explained hereinafter.

On the other hand, if the first set of terminals to which the brushes of the first selector have been connected, are the terminals of a busy second selector, then terminal 228 is grounded. In such a case, the busy ground is extended to brush 225 and thence over the bottom inner back contact of relay 212 to keep said relay short-circuited and therefore unoperated, and also to complete previously described circuits for relay 205 and rotary magnet 213 both of which reoperate. Rotary magnet 213 now rotates the brush shaft to the next set of terminals and also releases relay 205, which, on restoring, deenergizes rotary magnet 213 as previously described. This cycle of operations is repeated until an ungrounded guard terminal 228 of an idle second selector is reached such as, for example, second selector 250, at which time relay 205 will remain released, stopping the further rotation of the brushes and relay 212 will energize as previously described.

When the first selector 200 has established a connection with an idle second selector 250, the member's station line loop is extended to the line relay 201' over the Nos. 3 and 4 back contacts of relay 212'. Relay 201' operates, in turn operating relay 206'. At its lower contact, relay 206' connects holding ground to terminal 228 thereby holding relay 212 operated and extending holding ground over the bottom inner contacts of relay 212 to conductor 141. Inasmuch as the second selector 250 is identical with first selector 200 both in structure and in circuit organization, it is believed sufficient to say, without describing further circuit operations in detail, that the second selector responds to the next series of impulses transmitted from the repertory dial 101 and that, in response to this series of impulses, the second selector brushes 229 to 233, inclusive, will be positioned on the first set of idle terminals by the operation of rotary magnet 213' in the row of terminals to which the brush shaft will have been raised by the operation of vertical magnet 207'. Each of the pieces of apparatus in selector 250 has been given a designation similar to the corresponding piece of apparatus in first selector 200 except that each of said designations has been primed so that, with what has already been said of the operation of the first selector 200, corresponding operations of selector 250 may be easily followed.

When the brushes of second selector 250 have been established in contact with the terminals of an idle connector 300, a circuit is completed for impulsing relay 305 extending from grounded battery through the upper winding of said relay, lower normal contacts of relay 303, conductor 335, brush 233 and cooperating terminal, No. 4 front contacts of relay 212', thence as traced in a loop through the first selector 200, line-finder, member's station, first selector 200, No. 3 front contacts of relay 212', brush 232 and cooperating terminal, conductor 336, top normal contacts of relay 303, bottom winding of relay 305 to ground. Relay 305 operates and completes an obvious circuit for relay 304 which operates and connects ground through its left outer contacts to the guard conductor 337, which, over brush 231 and the bottom outer front contacts of relay 212', serves to hold relays 212', 212 and 105 in an operated position.

The tens group of impulses is now automatically transmitted from the repertory dialing device 101, causing relay 305 to respond thereto but relay 304, being slow-to-release, remains unaffected. On the release of relay 305, in response to the first impulse, a circuit is completed extending from ground through the back contacts of said relay, right front contacts of relay 304, normal contacts of the vertical off-normal springs 310, winding of relay 306, winding of vertical magnet 308 to grounded battery. Both relay 306 and magnet 308 operate in this circuit, the latter stepping the brush shaft vertically one step so that the brushes 338 to 342 inclusive are in the plane of their respective first level of terminals. As soon as the brush shaft leaves its normal position, the vertical off-normal springs 310 operate and the vertical magnet circuit is then completed through the winding of relay 306, front contacts of said relay, bottom alternate contacts of the vertical off-normal springs 310, right front contacts of relay 304 to ground on the back contacts of relay 305.

The remaining impulses of the series for the tens digit now cause the operation of the connector 300 in the same way as the impulses of the previous two digits caused the operation of first selector 200 and second selector 250, respectively, that is, by the response of relay 305 to the impulses and the opening and closing of the vertical magnet circuit through the contacts of relays 304 and 306, both of which, being slow-release, remain in an operated position during the transmission of the impulses.

In the interval following the reception of the last impulse of the tens digit and the transmission of the first impulse of the units digit, relay 305 operates, followed in turn by the release of relay 306. The repertory dialing device 101 now transmits the last series of impulses comprising the units digit and, on the opening of the line following the first impulse, relay 305 releases as before and completes a circuit extending from ground through its back contacts, right front contacts of relay 304, lower alternate contacts of vertical off-normal springs 310, back contacts of relay 306, top inner contacts of relay 314, winding of relay 315 to grounded battery. A parallel circuit is further completed from the winding of relay 315, top No. 1 contacts of relay 343, winding of rotary magnet 309 to grounded battery. Both relay 315 and rotary magnet 309 operate in these circuits, the former connecting brush 340 through its front contact and lower No. 3 contacts of relay 343 to the winding of relay 314 and the latter rotating the brush shaft one step so that brushes 338 to 342, inclusive, engage the first set of terminals in their respective bank levels. At the end of the first impulse, relay 305 reoperates and causes the retraction of rotary magnet 309. Relay 315, however, being slow-release, does not release between impulses and continues to connect brush 340 with the winding of relay 314. Each succeeding impulse causes the release of relay 305 and the consequent operation of rotary magnet 309 whereupon, with each succeeding operation, the brush shaft is advanced a step and the brushes engage a succeeding set of terminals until, on the final impulse of the units digit, the brushes engage the set of terminals belonging to the wanted member's line.

At the instant the line is seized and before relay 315 releases, a test is made to determine whether the line is busy or free. If the line is busy, ground will be connected to brush 340 by virtue of another connector, similar to connector 300, being positioned on the line terminals. This ground comes from the No. 2 bottom contacts of relay 343 in the other connector, across the multipled terminals, to brush 340 and from thence a circuit is completed over the front contacts of relay 315, bottom No. 3 back contacts of relay 343, winding of relay 314 to grounded battery. Relay 314 operates, opens the circuit of relay 315 and completes a busy tone circuit to the calling member's station 100 extending from grounded battery through the secondary of tone coil 312 of which the primary is connected to a source of tone current, condenser 323, bottom contacts of relay 314, condenser 344, conductor 335, brush 233 and thence over the selectors, linefinder and member's station loop, back to brush 232, conductor 336, condenser 345, upper winding of relay 303, to grounded battery. This tone is induced in the circuit above traced, is heard by the member in the telephone receiver at station 100 indicating to him that the line is busy, and that he should restore the receiver and then reestablish the connection after a suitable interval.

If the line is free, no ground will be connected to brush 340 and relay 314 will not operate. After relay 315 releases, therefore, a circuit is completed extending from ground over the left outer contacts of relay 304, top outer back contacts of relay 314, lower winding of relay 343, back contacts of relay 315, brush 340 and associated terminal, winding of relay 325 and resistance 357 to grounded battery. This circuit causes the operation of relay 325, but the quantity of current is just sufficient to operate relay 343 to the extent of closing its bottom No. 1 contacts, whereupon a locking circuit is completed for this relay to allow its full operation, said circuit being traced from ground on the left inner contacts of relay 304, bottom No. 1 contacts of relay 343, upper winding of relay 343, winding of rotary magnet 309 to grounded battery. The quantity of current flowing through this circuit while sufficient to insure the full operation of relay 343, is insufficient to cause the operation of the rotary magnet. On operating, relay 343 connects the line conductors from second selector 250 through to the brushes 338, 339, 341 and 342 and further connects ground through its bottom No. 2 contacts to brush 340 to place a busy condition on the called line and further hold relay 325 in an operated position.

Relay 325, over its No. 4 and No. 5 front contacts, connects the called broker's line instrument 327 to the line conductors extending to brushes 341 and 342 preparatory to ringing on the line; over its No. 3 contacts and conductor 317, it completes an obvious circuit for the broker's line cut-off relay 403 which operates, said ground further extending over the right outer back contacts of relay 407 to conductor 408 which further extends to the guard terminal in the bank of connector 700 to guard the line against seizure over another channel as explained hereinafter; over its No. 1 and No. 2 contacts it prepares circuits for operating relays 362, 363 and 364. The functioning of these relays and a detailed tracing of their operating circuits will be discussed hereinafter.

The broker's station 327 will now be rung, due to the completion of an interrupted ringing circuit extending from grounded battery ringing current source 302, interrupter 324, top No. 4 contacts of relay 343, top winding of relay 334, bridged by the series path consisting of condenser 349 and resistance 348, top outer back contacts of relay 334, top No. 6 contacts of relay 343, brush 342 and associated terminal, No. 5 front contacts of relay 325, conductor 347, through the station bell, conductor 346, No. 4 front contacts of relay 325, brush 341 and associated terminal, top No. 5 contacts of relay 343, top inner back contacts of relay 334 to ground. The alternating current flowing through this circuit and causing the station bell to ring is not sufficient, however, to cause the operation of relay 334 so that this circuit is not interrupted until the station answers, whereupon the bell is short-circuited and the current then flowing through the circuit, either alternating during the ringing interval or steady during the silent period, will cause relay 334 to operate, opening the ringing circuit, locking itself up through its lower winding and contacts to ground on the left inner contacts of relay 304 and, through its upper pairs of front contacts, joining the talking conductors to complete the conversational circuit between the member's station 100 and the broker's station 327.

The removal of the receiver at station 327 in response to the call and the consequent operation of relay 334, further serves to operate the back bridge relay 303 which supplies talking battery to the broker's station, over a circuit extending from grounded battery through its top winding, top inner front contacts of relay 334, thence over the called loop as traced back to the top outer front contacts of relay 334, lower winding of relay 303 to ground. Relay 303 operates and reverses the direction of current flow over the calling loop. This reversal of current may be used, if desired, to operate a registering device at the member's station 100 to indicate the completion of the call. This registering feature, however, is not disclosed in the drawings because it is well known in the telephone art, it being mentioned to direct attention to the fact that if a call registration feature is required for traffic or other purposes, it may be incorporated in any suitable manner for registering the completion of the call.

One of the objects in having a floor member call his broker's office is to permit the transmission and confirmation of buying and selling orders that are to be executed by the member on the floor of the exchange. Consequently, when a connection, such as the one described above, is established, it is usually for the purpose of transmitting such an order from the broker's office and confirming it in writing between the broker and the member. To consummate this end, each member's booth in the exchange, in addition to having a telephone instrument and a repertory dial, is further provided with a "receiving" teletype device 150 which is capable of responding to the operation of a "transmitting" teletype device 360 at the broker's office and record, on an electrically operated typewriter or similar device associated with the responding equipment 150, the message transmitted by the equipment 360. This message will usually be an order such as to "buy I. F. D. at 13¼" or sell "S. E. X. at the market" or some other such instruction having to do with the purchase or sale of a security, coupled with whatever other miscellaneous information may be necessary for verifying the order such as, for instance, the time of the order, the salesman, etc.

Both the receiving equipment 150 and the transmitting equipment 360 are too well known in the telegraph art to require extended and detailed description here for a complete understanding of the invention, since equipment 150 is the usual "start-stop" telegraph receiver coupled with a printer or electrical typewriter, and equipment 360 is the usual "start-stop" transmitter coupled with a suitable typewriter keyboard. Because of the well-known character of equipments, they are only schematically indicated in the drawings with only such circuit and apparatus elements disclosed as will be necessary for one skilled in the art to understand the principle and operation of the invention.

The transmitting circuit 360 at the broker's office comprises the sending commutator with a revolving distributor arm 351 connected by a friction clutch (not shown) to a shaft which is coupled to the armature of a motor 307 or to the rotating element of any other suitable source of power, a start magnet 322 which serves to lock the distributor arm 351 against rotation, five sending bars 311 which are positioned to make contact with five conductors each extending, respectively, to five segments 1–5 of the outer commutator with which the distributor arm can be engaged, and one conductor 353 which extends to segment 6 of said commutator and is connected to battery, preferably through one of the bars. These conductors are connected to the bars in separate combinations depending upon the key depressed on the keyboard 313 in order to transmit a group of from one to five impulses according to the well-known five unit pulse code used in multiplex telegraph systems to indicate the character designated by the operated key.

At each of the member stations in the stock exchange, the receiving circuit 150 is shown as comprising a start magnet 113, a commutator, five selecting magnets 121–125 connected to five separate segments of the outer commutating ring and adapted to set a plurality of type bars (not shown) according to the combination of magnets operated by the distributor arm 142 as it revolves over the face of the commutator when driven from source of power 118. A printer magnet 120 is connected to the segment 146 contiguous to segment 5 which is connected to receiving magnet 125 and operates to start the printing apparatus to print the character called for by the operated combination of receiving magnets. The printing equipment is not shown inasmuch as it is a well-known piece of apparatus and may be either of the typewriter or "page printer" variety depending upon commercial and traffic expediences.

With this preliminary explanation, the circuit operations by which, after the talking connection has been established, a buying or selling order is transmitted from the broker's office to the calling member station, may now be followed.

As soon as the broker is ready to transmit the order, he depresses the key in the sending keyboard 313 which designates the first letter of the word he desires to transmit. This effects the closing of the start key 316. The operation of the keyboard key sets one or more of the five bars 311 in the appropriate combination required to transmit the pulse code of the letter corresponding to the key depressed, which setting, in turn, causes grounded battery to be connected to those segments of the commutator which are connected by conductors to the operated bars. The operation of key 316 completes a circuit for the start magnet 322 extending from grounded battery through the contacts of said key, winding of magnet 322, the two inner brushes of distributor arm 351 and associated contacts of the commutator to ground. Magnet 322 operates and unlatches the distributor. The power supply circuit for motor 307, however, is closed through the top contacts of relay 362, which is not operated at this time.

With the distributor arm in the normal position, its upper brush is in contact with segment 6 and this segment is, in turn, connected by way of conductor 353 to battery. Hence, a circuit is closed while the distributor arm 351 is still engaged with segment 6, which extends from grounded battery over conductor 353, segment 6, two upper brushes of the distributor arm 351, conductor 354, lower winding of relay 362, winding of relay 363, upper normal contacts of key 326, No. 2 front contacts of relay 325, brush 339 and associated terminal, top No. 3 contacts of relay 343, conductor 355, brush 230 and associated terminal, No. 2 contacts of relay 212′, brush 224 and associated terminal, No. 2 contacts of relay 212, conductor 137, No. 3 contacts of relay 105, brush 130 and associated terminal, winding of relay 119 to ground. Relay 362, 363 and 119 operate in this circuit. Relay 362, through its top contacts, connects the power supply to the distributor motor 307, which is started and causes distributor arm 351 to revolve over the face of the commutator. As the distributor leaves its normal position, the circuit of the start magnet 322 is opened, whereupon the latch arm is retracted to its normal position, ready to block the distributor after one revolution. Through its bottom contacts relay 362 connects grounded battery to the armature of relay 363 which, in operating, extends said battery to the armature of relay 364, said last relay performing no function at this time. Relay 119 in operating closes an obvious circuit for relay 117 which operates and locks in a circuit from grounded battery through its bottom winding and contacts, brush 129 and associated terminal, No. 2 contacts of relay 105, conductor 136, No. 1 contacts of relay 212, brush 223 and associated terminal, No. 1 contacts of relay 212′, brush 229 and associated terminal, conductor 356, top No. 2 contacts of relay 343, brush 338 and associated terminal, No. 1 contacts of relay 325, lower normal contacts of key 326, winding of relay 364 and upper winding of relay 362 to ground. Relay 364 in operating extends the battery on its top front contacts to conductor 366. Relay 117, through its top inner contacts, closes the power supply to the motor 118 which drives the distributor shaft, thereby operating the motor and rotating shaft but not affecting the distributor arm 142 which is latched in the normal position by the armature of start magnet 113. The motor 118, as is the case in all telegraph systems operating on the "start-stop" principle, revolves at the same speed as motor 307 in the broker's telegraph equipment and the clutch mechanism of distributor arm 142 is so adjusted to the driving shaft as to cause said distributor arm to revolve about the face of the commutator at the same speed as distributor arm 351 of the sending circuit 360.

Now, so long as distributor arm 351 of the sending circuit 360 is in contact with segment 6, the above traced circuit for relay 119 is effective, but nothing further happens so long as distributor arm 142 at the receiving equipment remains in contact with segment 6. When, however, distributor arm 351 has revolved beyond segment 6 and on to segment 7, the operating circuit of relays 119, 362 and 363 is broken, whereupon relays 119 and 363 release, but relay 362 remains operated in the locking circuit of relay 117. The release of relay 119 causes a circuit to be completed from grounded battery through the top outer contacts of relay 117, top inner back contacts of relay 119, segment 143 of the commutator, brushes of the distributor arm 142, segment 144, winding of start magnet 113 to ground. Magnet 113 operates and unlatches the distributor arm 142 which now rotates around the face of the commutator. Inasmuch as the motor 118 which drives distributor arm 142 runs at the same speed as motor 307 which runs the distributor arm 351, it is clear that when distributor 351 has reached a position such that its outer brush makes contact with segment 7, distributor arm 142 will still be in contact with its normal segment. Hence when distributor arm 142 begins to move, distributor arm 351 will be in contact with segment 7, and by the time distributor arm 351 will have traveled over segment 7 and on to segment 1, distributor arm 142 will have traveled a corresponding distance. Its outer brush will be in contact with segment 1 and its inner brush in contact with feed segment 145, which is connected to the inner front contact of relay 119. Now if the key depressed at the keyboard 313 is that of a character such that its pulse code calls for a pulse in the first position or segment 1, battery will be connected to segment 1 and thence to conductor 354, completing once more the previously described circuit for relay 119 which now operates to extend battery from the top outer contacts of relay 117, inner front contacts of relay 119, segment 145, distributor arm 142, segment 1, winding of code magnet 121, to ground. Magnet 121 operates and locks mechanically (in a manner not shown) in preparation to set the type of the character called for by the pulse code when all the pulses of the code have been transmitted. On the other hand, if the key depressed on the keyboard 313 is that of a character having a pulse code that does not call for a pulse in the first position, there will be no battery connected to segment 1 associated with distributor arm 351, relay 119 will not operate and no circuit will be closed for code magnet 121 at the time that distributor arm 142 is in contact with its associated segment 1.

As the distributor arm 351 advances over segments 2, 3, 4 and 5, distributor arm 142 will revolve in synchronism with distributor arm 351 and advance over the corresponding segments 2, 3, 4 and 5 and the spacing segments between each of the numbered segments, the length of each numbered segment and its contiguous spacing segment being equal to the length of each of the numbered segments 1-5 accessible to distributor arm 351. Now if, on the commutator associated with distributor arm 351, battery is connected, by the setting of the keyboard bars 313, to any or all of the five segments, the circuit of relay 119 will be closed for such segments and the circuit for operating any of the corresponding magnets 121 to 125 inclusive will be again completed depending on the segment with which the distributor arm 142 is engaged at the time the battery is connected to conductor 354 by the distributor arm 351 engaging a correspondingly numbered segment. In this way, the five unit pulse code of the character designated by the key depressed at the keyboard 313 is transmitted by the sending circuit 360 and received and recorded by the mechanically locked magnets 121-125 of the receiver 150, which magnets were operated by the incoming impulses.

When distributor arm 142 engages segments 146 and 147 after it has left segment 5, a circuit is completed for the printer magnet 120 extending from grounded battery, segment 147, brushes of distributor arm 142, segment 146, winding of printer magnet 120 to ground, operating said magnet which, in turn, operates the printing mechanism by which the character designated by the combination of the operated code magnets 121 to 125 is printed on a paper strip. When distributor arm 142 has passed beyond segments 146 and 147, the circuit of the printer magnet 120 is opened, thereby releasing the printing mechanism and further unlocking the code magnets in the well-known manner.

When the two distributor arms 142 and 351 have reached their normal segments, that is, segment 144 and segment 6, respectively, the sending and receiving circuits are ready to transmit and record, respectively, the character designated by the next key depressed on the sending keyboard 313 and results in the start magnet 322 being operated again to permit the distributor arm 351 to make another revolution, in turn causing the operation of start magnet 113 to permit another revolution of distributor arm 142 for the purpose of operating the same or another combination of the code magnets 121 to 125 in accordance with the pulse code of the next character. These operations continue until the entire message is transmitted and recorded, after which the contacts of key 316 remain open, effecting the release of start magnet 322 which, in its normal position, latches distributor arm 351 and prevents any further rotation. With distributor arm 351 normal, since no more impulses are transmitted, no circuit is available to operate start magnet 113 which latches distributor arm 142 in the normal position.

The discussion hereinbefore given described how the receiving distributor 142 at the member's station, in cooperation with the line relay 119, received and printed a message transmitted by the sending distributor 351 at the broker's station. Since the winding of relay 363 is in series with the winding of the relay 119, relay 363 responds in unison with relay 119 and connects battery to conductors 366 and 368 alternately to cause the distributor arm 367 of receiver 350 at the broker's station to function in the same manner as distributor arm 142 at the member's station, and to print the same message, thereby providing for the broker's station a record of the outgoing transmission. During the sending of the message, although the current through the lower winding of relay 362 is interrupted, this relay remains steadily operated over the circuit before traced, through its upper winding and the winding of relay 364.

When conversation between the parties is terminated and the receiver is restored at station 100, the circuit of relay 305 is opened causing said relay to release, followed, after an interval, by the release of relay 304. The release of relay 304 unlocks relays 334 and 343 whereupon brushes 338 to 342 are disconnected causing thereby the release of relay 117 at the member's station which opens the power supply to the distributor shaft motor 118, and further causes a circuit for release magnet 320 of the connector 300 to be closed, said circuit extending from grounded battery through the winding of said magnet, top contacts of vertical off-normal springs 310, bottom No. 1 contacts of relay 343, back contacts of relay 304, back contacts of relay 305 to ground. Release magnet 320 operates in this circuit and restores the brush shaft to normal. The release of relay 343 further opens the circuit of relay 325 which releases. The release of relay 325, opens the circuit of the member's line cut-off relay 403, and the circuit of relays 362, 363, 364, 117 and 119 all of which release. With the release of relay 403 ground is disconnected from conductor 408 thereby removing the busy condition from the line terminals in the connector banks accessible over the switching trains from the common station and the report station; the release of cut-off relay 403 reconnects the broker's line relay 402 in readiness to respond to the initiation of a call as more particularly described hereinafter, while the release of relay 362 disconnects the power supply from the motor 307 causing the distributor arms 351 and 367 to stop.

Upon the release of relay 304, ground is removed from conductor 337 the effect of which is to remove ground from brush 231, causing thereby the release of relay 212' in second selector 250 whereupon a circuit is completed for release magnet 203' extending from grounded battery through the bottom contacts of vertical off-normal springs 211', top back contacts of relay 206', back contacts of relay 201', bottom outer back contacts of relay 212' to ground. Release magnet 203' operates and restores the switch shaft to normal.

By the removal of ground from brush 231, relay 212 of the first selector 200 likewise releases and, by the completion of a circuit for release magnet 203 similar to that of release magnet 203' in the second selector 250, said magnet operates and restores the brush shaft to normal.

With the release of relay 212, ground is disconnected from conductor 141 whereupon relay 105 releases and a circuit is completed for release magnet 111 extending from grounded battery through the winding of said magnet, lower contacts of vertical off-normal springs 148, bottom inner back contacts of relay 106, bottom outer back contacts of relay 105, top back contacts of relay 107, upper alternate contacts of vertical off-normal springs 148 to ground. Release magnet 111 operates and restores the finder brush shaft to normal. Relay 108 may, however, remain operated if, at this time, relay 104 is operated as the result of another call having been started from another member station, in order not to disturb the starting of a succeeding finder which operates to find the second calling line. When such a line has been found, relay 104 releases as already described, causing in turn the release of relay 108, thereby restoring the entire circuit to normal.

Having described in detail the establishment of a connection between a member's station in the exchange and the broker's office, I will now describe, in general terms, the establishment of connections, (a) from the "common" station shown in Fig. 4 to all the outlets available to said station, (b) from the "report" station shown in Fig. 5 to all outlets available to said station, and (c) from the broker's office to all outlets available to said office. I will then further show how, by means of my invention, it is possible to "page" a floor member directly from the broker's office.

Considering first the establishment of a connection from the common station 400, the removal of the receiver from the switch-hook causes the operation of the line relay 402' and the operation of relay 404', both of which relays are identical in function, respectively, with the line relay 102 and the group relay 104 of the member station equipment shown in Fig. 1. This last relay, that is, relay 404' initiates the operation of the line-finder, which is only schematically indicated on the drawings since it is identical in construction with the line-finder shown in Fig. 1, whereby the vertical magnet operates to step the brush shaft to the level of terminals coincidental with the segment on commutator 427', grounded by the contact of relay 404' and thereafter causes the operation of the rotary magnet to rotate the brush shaft into connection with the calling line terminals, after which relay 405' operates and extends the line and its associated apparatus to the first selector 600'.

Relay 601 then operates over the line loop and responds to the impulses transmitted from the telephone dial. Now, if the person using the common station desires to reach the ticker delay announcer, then, according to the trunking plan outlined in Fig. 8, he dials the digit 2, whereupon the brush shaft carrying brushes 623 to 627, inclusive, is stepped to the second bank level under the influence of vertical magnet 607 and then rotated automatically under the influence of rotary magnet 613 to the first set of idle terminals extending to the ticker delay equipment. The service rendered over this apparatus may be of any suitable type, either manual or automatic, such as, for instance, a regular manual position over which the announcement may be given by an operator, or of the magnetic tape-recording type shown and described in the Patent 1,944,238 to C. N. Hickman, or of the call announcer type such as that described in my own Patent No. 1,992,271.

Should the party desire to reach the quotation announcer, then he dials a three or four digit code depending upon the number of securities for which this service is to be given except that, according to the preferred trunking plan shown in Fig. 8, the first digit is either an 8 or a 9, whereupon the impulses of the first digit will set the brush shaft of the first selector 600' on the 8th or 9th level of terminals, from which they are rotated into contact with an idle set of terminals extending to a second selector. The second digit will then set the brush shaft of said second selector on the level of terminals determined by the impulses of the second digit and the brush shaft is then rotated to an idle set of terminals in this level extending to a connector. The brushes of the connector are then raised to the terminal level determined by the tens digit of the stock code and further rotated to the set of terminals in that level determined by the units digit of the stock code.

As in the case of the ticker delay service, the quotation announcing facilities may be of the manual type with an operator giving the quotations desired, or of the magnetic tape-recording type described in the above-mentioned patent to Hickman or it may be of the call announcer type described in my above-mentioned patent.

Should the party using the station 400 desire to reach the operator, then he dials the single digit 0. The ten impulses produced by the dial will cause the brush shaft to be stepped to the tenth vertical level and then rotated automatically to the first set of idle terminals extending to an operator's position.

If the party using the common station desires to communicate with his own broker's office or with some other broker's office on matters not involving secrecy, he dials the office number which, according to the trunking plan of Fig. 8, may be a four digit number having 5, 6, or 7 as the first digit, since the trunks from the first selectors over which connections to brokers' lines may be extended are located on the 5th, 6th and 7th levels of terminals.

Let us assume that the party desires to call the broker's line 327 shown as terminating in Fig. 3. He dials the number in the usual way and the first and second selectors 600″ and 650′ are positioned, respectively, to reach the connector 700 which is identical in construction and design to the connector 300. After the connector is set on the line terminals in the manner described for connector 300, relay 743 operates in a circuit which extends from ground through the left outer contacts of relay 704, top outer back contacts of relay 714, lower winding of relay 743, bottom back contacts of relay 715, brush 740 and associated terminal, conductor 408, outer back contacts of relay 407, winding of cut-off relay 403 to grounded battery. Both relays 743 and 403 operate. Relay 403, at its right contacts, disconnects the windings of the line relay 402 while through its left inner contacts it connects ground to conductor 301 which extends through the bottom contacts of relay 325 to a point between resistance 357 and the winding of relay 325, thereby marking as busy the sleeve terminals of the called broker's line 327 in the banks of the connectors 300 which have access thereto. Relay 743 operates and causes the line conductors to be extended to connector 700. Station 327 is then rung over conductors 758 and 759 through No. 4 and No. 5 back contacts of relay 325 in the usual way and, when the receiver is removed from the hook, relay 734 operates to complete the talking connection.

The common station, like the private member's station, is equipped with a printer receiving device 450 similar in every respect with the printer receiving device 150, either of which will operate in conjunction with the sending equipment 360 at the broker's office for the purpose of receiving written orders, confirmation, etc., and the circuit operations between the broker's office and the common station to control the sending and receiving equipment 360 and 450 respectively is the same as before described for the control of the sending and receiving equipment 360 and 150 and, therefore, need not be described again.

When all business between the party using the common station and the member's office is terminated, the party restores the receiver and the apparatus restores to normal as before described for the member's station.

The report station shown in Fig. 5, is for the purpose of providing floor members with facilities for reaching the various brokers' offices in order to confirm sales or other business requiring written evidence of transactions and for which no secrecy is necessary. For this reason it is provided both with a telegraph transmitter 560, which is similar to the transmitter 360 at the broker's office, and a telegraph receiving printer 550, which is similar to the receivers 150, 350 and 450. This station, according to the trunking layout of Fig. 8, has accessibility through the first selector directly to the ticker delay service and to the operator while, through the second selectors 650′ available to the common station it can reach any of the brokers' offices by dialing of their respective numbers.

Assuming, therefore, that a floor member desires to make a written report, and that the office to which the report is to be made is the one indicated by station 327, he removes the receiver from the switch-hook and dials the broker's number, whereupon the first and second selectors and connector are positioned to connect the report station with the broker's station in the manner previously described for the common station.

Assuming that the established switching train from the report station 500 to the broker's station 327 comprises the line-finder 510, first selector 600″′, second selector 650′, and the connector 700, then, as soon as said connection is established, a circuit is completed extending from battery over conductor 533, segment 6 of the commutator of transmitter 560, upper brushes of distributor arm 551, conductor 554, winding of relay 519, brush 530 and associated terminal of line-finder 510, No. 2 contacts of relay 505, conductor 536 through the contacts of a relay in first selector 600″′ corresponding to relay 612 in first selector 600′, brush 623′ and associated terminal in second selector 650′, No. 1 contacts of relay 612′, brush 629 and associated terminal, conductor 756, upper No. 2 contacts of relay 743, brush 738 and associated terminal, conductor 707, No. 1 back contacts of relay 325, lower normal contacts of key 326, winding of relay 364, upper winding of relay 362 to ground. Relays 362, 364 and 519 operate. As before, relay 362 connects the power supply to the distributor motor 307 which is started, but since no keys are depressed in keyboard 313, key 316 is normal and distributor arm 351 remains latched to the armature of start magnet 322. Furthermore, there is at present no circuit for operating start magnet 327 of the receiver 350 so that while motor 307 is in operation distributor arm 367 likewise remains in its normal position.

At the report station, relay 519 closes an obvious circuit for relay 517 which locks over its lower winding in a circuit which extends from ground through the lower winding and lower contacts of said relay, brush 529 and associated terminal on line-finder 510, No. 3 contacts of relay 505, conductor 537 contacts of a relay in first selector 600″′, similar to relay 612 of first selector 600′, brush 624′ and associated terminal in second selector 650′, No. 2 contacts of relay 612′, brush 630 and associated terminal, conductor 755, No. 3 contacts of relay 743, brush 739 and associated terminal, conductor 757, No. 3 back contacts of relay 325, upper normal contacts of key 326, winding of relay 363, lower winding of relay 362, segment 361 of the commutator associated with transmitter 360, upper brushes of distributor arm 551, segment 6 of said commutator, conductor 353 to battery.

Relay 517, on operating, completes the power supply circuit to distributor motor 518 and thereby causes the distributor shaft associated with its armature to rotate. Distributor arms 551 and 542, however, are latched to their respective start magnets 522 and 511 so that nothing further occurs until the person using the report station is ready to key the message he wishes to transmit upon the sending keyboard 513.

The operation of any one of the keys upon said keyboard 513 closes the start key 516 while the operated letter or number key on said keyboard further sets one or more of the five bars 511 in the appropriate combination required to transmit the pulse code of the letter or number corresponding to the key depressed, which setting, in turn, causes grounded battery to be connected to the segments of the commutator connected by conductors to the operated bars. The operation of key 516 completes a circuit for start magnet 522 extending from the grounded battery through the contacts of said key, winding of magnet 522, the two inner brushes of distributor arm 551 and associated contacts of the commutator, to ground. Magnet 522 operates, unlatches the distributor arm 551 and causes it to make one revolution. When the distributor has advanced to segment 7, the circuit of relays 519, 364 and 362 is broken, whereupon relays 519 and 364 release. Relay 519 completes a circuit for start magnet 511 extending from grounded battery through the top upper contacts of relay 517, outer back contacts of relay 519, segment 543 of the commutator, the two brushes of distributor arm 542, segment 544 of the commutator, winding of magnet 511 to ground. Magnet 511 operates and unlatches distributor arm 542 which now begins to revolve around the face of its associated commutator. Hence, by the time distributor arm 551 is engaged on segment 7, distributor arm 542 is leaving its normal position. In the meanwhile, the release of relay 364 completes a circuit from ground through the winding of start magnet 327 of receiver 350 at the broker's office, segments 328 and 329 of the commutator, the brushes of distributor arm 367, conductor 368, top back contacts of relay 364, front contacts of relay 363, to grounded battery through the bottom contacts of relay 362. Start magnet 327 thus operates, unlatches the distributor arm 367 and causes said distributor arm to rotate one complete revolution. Now since the circuit of start magnet 511 of the receiver 550 at the report station and the circuit of start magnet 527 of the receiver 350 at the broker's office are closed at the same time, and since motors 518 and 307 are in synchronism, distributor arm 542 and distributor arm 367 will engage the corresponding segments of their associated and respective commutators at the same time, and as distributor arm 551 advances to segment 1 by the time distributor arms 542 and 367 reach their own respective segments 1, it is clear that if a battery condition prevails on segment 1 of the commutator associated with distributor arm 551, the consequent closure of the circuit of relays 519 and 364 (as will be described shortly) will effect the operation of these relays which, in turn, will apply battery to the corresponding segments of the commutators associated, respectively, with distributor arms 542 and 367. Hence if a key in the keyboard 513 has been depressed and the code of the character calls for a battery pulse over the first segment of the commutator associated with transmitter 560, segment 1 will have battery connected to it by the fact that the bar which is controlled by the key will have been placed in contact with the conductor extending between the segment and the bar. Therefore, when distributor arm 551 is on segment 1 and distributor arms 542 and 367 are likewise on their respective segments 1, an impulse circuit will be completed which extends from grounded battery through the bar and segment 1 of transmitter 560, circular segment 561, conductor 554, and thence as previously traced through the windings of relays 519, 364 and 362. Relay 519 operates and connects battery to segment 545 of its associated commutator which, in turn, completes a circuit through distributor arm 542 resting upon segment 1, winding of the first pulse magnet 521 to ground. Concurrently, relay 364 also completes a circuit for a corresponding pulse magnet in receiver 350, which circuit extends from battery on the lower contacts of relay 362, front contacts of relay 363, front contacts of relay 364, conductor 366, circular segment 332, brushes of distributor arm 367, segment 1, winding of the first pulse magnet to ground. Thus, if the letter or number designated by the key depressed at keyboard 513 is one which calls for a pulse in the first of the five positions of a five unit code, this pulse will cause a pulse magnet to be operated in the report station receiver 550 and a corresponding pulse magnet in the receiver 350 of the broker's office.

In the same manner, as the three distributor arms 551, 542 and 367 continue to rotate through a single revolution, the segments on the commutator associated with transmitter 560 which have battery connected to them through the bars set by the depressed keys at keyboard 513 will cause corresponding pulses to be transmitted over conductor 554, which will set the pulse magnets of receiver 550 and corresponding pulse magnets in receiver 350 for printing the character corresponding to the key both at the report station 500 and at the broker's office 327 when the printer magnet 520 of receiver 550 and printer magnet 333 of receiver 350 have been operated at the time that the distributor arms 542 and 367 have reached segments 547 and 318, respectively. In this manner, as each key is depressed in keyboard 513, the character designated by the key is printed at the report station and also at the broker's office. The message, therefore, is not only transmitted and printed at the broker's office by the receiver 350 but a copy of it is also printed by receiver 550 at the report station.

The disconnection of the apparatus, when the telephone receiver is restored at the report station 500, is identical with the release of similar apparatus used in establishing a connection from member station 100. Inasmuch as these operations have already been described, there is no necessity of unduly lengthening this description by further detailing circuit operations which can be easily followed from what has already been said.

I will now describe, briefly, the manner in which a broker, such as, for instance, the broker represented by station 327, may establish a connection to any other broker or to any of the service outlets such as, for instance, the operator, the quotation announcer or the ticker delay. In removing his receiver from the switch-hook a circuit is completed for line relay 402 which extends from grounded battery through the left winding of relay 402, right inner contacts of cut-off relay 403, conductor 410, No. 5 back contacts of relay 325, conductor 347, through the telephone instrument 327, conductor 346, No. 4 back contacts of relay 325, conductor 409, right middle contacts of relay 403, right winding of line relay 402 to ground. Relay 402 operates and initiates the operation of a relay 404 which grounds the particular segment on commutator 427 that designates the level of terminals in the line-finder represented by relay 405 to which the broker's line is connected. The line-finder elevator shaft, as a result of circuit operations similar to those already described for the operation of the line-finder having access to the member station 100, is then caused to be raised and rotated to the terminals of the broker's line, thereby extending his line through contacts of relay 405 to the first selector 600, whereupon cut-off relay 403 is operated in the usual way and line relay 402 is released. Now, depending upon the digit code dialed by the broker, the brush shaft of the first selector switch 600 may be caused to be connected with the ticker delay equipment or to an operator's position, or to the quotation announcer through a switching train comprising a second selector and a connector as previously described. Should he desire to communicate with another broker, the first selector switch 600 is, of course, advanced into connection with a second selector 650 depending upon the first digit of the wanted broker's number, and the second selector will then locate an idle connector, such as connector 630, which, in response to the third and fourth digits of the broker's line number will advance its brush shaft to the terminals of the wanted broker's line in the same straightforward operation as previously described for the common station.

While the outline of connections above given is not intended as a description of the various detailed operations required for the setting of each of the selectors mentioned, it is believed that no such description is necessary in view of the detailed description already given of the operation of the first and second selectors involved for connections previously described.

Should the broker 327 desire to "page" a member on the floor of the exchange, it will only be necessary for him to depress key 326. When this key is depressed, a circuit is closed for relay 407 which extends from grounded battery through the winding of said relay, left outer contacts of cut-off relay 403, conductor 411, No. 1 back contacts of relay 325, bottom alternate contacts of key 326, through the broker's telephone station, conductor 711, upper alternate contacts of key 326, No. 2 back contacts of relay 325, conductor 713, left inner contacts of cut-off relay 403, to ground. Relay 411 operates, connects ground to a lamp in the floor indicator 412 to flash the number of the member on the indicator board, and further connects ground to conductor 408, which extends to the test terminals of the broker's line on the connector banks of the channels including connectors 700 and 630 to establish a busy condition for the calling line. The floor member, after noting his number flashed upon the indicator, proceeds to any one of the member stations to call the broker's office, which connection is established in the manner previously described over the secret channel disclosed by the apparatus shown in Figs. 1, 2 and 3. The terminal of the line accessible to connector 300 is, of course, not made busy by the operation of the floor indicator key 326 so that once the connection is established from the member station, relay 325 is operated in the manner described, the circuit for relay 411 is disrupted at its contacts and the floor indicator lamp is extinguished to indicate that the member has been successfully paged.

What is claimed is:

1. In a communication system, a first station having a telephone instrument and a telegraph transmitting instrument, a second station having a telephone instrument and a telegraph receiving instrument, and means for automatically establishing a communication circuit between said telephone instruments and a signaling circuit between said telegraph instruments independent of said communication circuit.

2. In a communication system, a first station having a telephone instrument and a telegraph receiving instrument, a second station having a telephone instrument and a telegraph transmitting instrument, and means under the control of said first station for automatically and simultaneously establishing a communication circuit between said telephone instruments and a signaling circuit between said telegraph instruments independent of said communication circuit.

3. In a communication system, a first station having a telephone instrument and a telegraph instrument, a second station having a telephone instrument and a telegraph instrument, an indicating device individual to said first station, means responsive to an operation at said first station for operating said indicating device, means for establishing automatically and simultaneously a communication circuit between the telephone instruments of said two stations and a signaling circuit between the telegraph instruments of said two stations independent of said communication circuit, and means responsive to the establishment of said circuits for retiring said indicating device.

4. In a communication system, a first group of stations, each of said stations having a telephone instrument and a telegraphic transmitting device, a second group of stations, each of said stations of said second group having a telephone instrument, a key-controlled dialing device, and a telegraphic receiving device, and means responsive to the application of a particular key to a key-controlled dialing device of any station of said second group for establishing independent telephonic and telegraphic circuits between said station and one particular station of said first group.

5. In a communication system, a first group of stations, each of said stations having a telephone instrument, a key, and a telegraphic transmitting device, a second group of stations, each of said stations in said second group having a telephone instrument, a key-controlled dialing device, and a telegraphic receiving device, a display board having a signal for each of said stations in said first group, means responsive to the operation of said key at a station of said first group for operating its identifying signal in said display board, means responsive to the application of a key identifying said calling station in the first group to the key-controlled dialing device of any station in the second group for establishing simultaneous connections between the telephones of said two stations and the telegraph instruments of said two stations, and means responsive to the establishment of said connections for extinguishing said signal on said display board.

6. In a signaling system for simultaneous telegraphy and telephony, a plurality of stations, directive switches for extending two independent connections between any two of said stations over the same switch train, means for telegraphing over one of said connections, and means for telephoning over the other of said connections.

7. In a signaling system for simultaneous telegraphy and telephony, a plurality of stations, directive switches for extending two independent connections between any two of said stations over the same switch train, a telegraph transmitter and a telegraph receiver at one of said stations, a telegraph receiver at the other of said stations, means responsive to the operation of said transmitter and operative over one of said connections for operating both of said receivers, and means for telephoning between said two stations over the other of said connections.

8. In a signaling system for simultaneous telegraphy and telephony, a plurality of stations, directive switches for extending two independent connections between any two of said stations over the same switch train, a telegraph transmitter and a telegraph receiver at each of said stations, means for telephoning between said two stations over one of said connections, and means including the other of said connections and responsive to the operation of either of said transmitters for operating both of said receivers.

9. A system for permitting the simultaneous operation of both telegraphic and telephonic equipment comprising four groups of stations, each of said stations having a dial impulse device, a telegraph receiver at each station in the first and second groups, a telegraph transmitter and a telegraph receiver at each station in the third and fourth groups, directive switches available to each of the stations in the first, second and third groups and responsive to the operation of said dial device at each of said stations for establishing two simultaneous connections over the same switch train between any of two stations and any station in said fourth group, means for telephoning over one of said connections, means including the other of said connections and responsive to the operation of said telegraph transmitter at said station in said fourth group if the switch train extends from a station in said first or third groups for simultaneously operating the telegraph receiver at each of said stations, and means including the other of said connections if the switch train extends from a station in said fourth group and responsive to the operation of the telegraph transmitter at the station of said fourth group for simultaneously operating the telegraph receiver at each of said stations.

10. In a communicating system, the combination with a plurality of groups of stations of means for extending private connections between the stations of two groups, means for extending other connections between the stations of other groups and the stations of one of said two groups, means in each of the stations to which connections are extended for operating a signal individual to each station, means responsive to the operation of said signal for rendering said other connections to the stations unavailable, and means responsive to the establishment of a private connection to each of said stations for restoring said signals.

11. A system for permitting the simultaneous operation of both telegraphic and telephonic equipment comprising stations provided with telephone and telegraph equipment, selective switches for establishing connections between the various stations to provide independent circuit paths for said telegraph and telephone equipment, and means under the control of the last switch in a connecting train between two stations for holding the telegraph equipment of one of the stations.

12. A system for permitting the simultaneous operations of both telegraphic and telephonic equipment comprising a plurality of groups of stations, each of said stations being provided with telephone and telegraph equipment, selective switches for establishing connections between the various stations to provide independent circuit paths for said telegraph and telephone equipment, dialing means at each station of a first of said groups responsive respectively to different key devices designating different stations in another of said groups for setting some of said selective switches into operative connections with said different stations in said other group, and other dialing means at each station of the remaining groups for setting the remainder of the selective switches into operative connections with the stations of said first group.

SAMUEL B. WILLIAMS.